Feb. 21, 1939.   J. J. WILLIAMS ET AL   2,147,804
APPARATUS FOR FORMING METAL CLOSURES
Filed Sept. 24, 1936
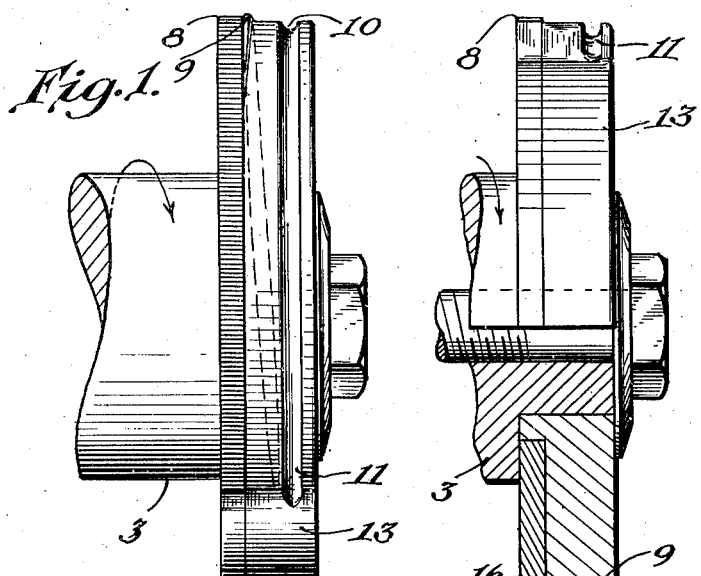
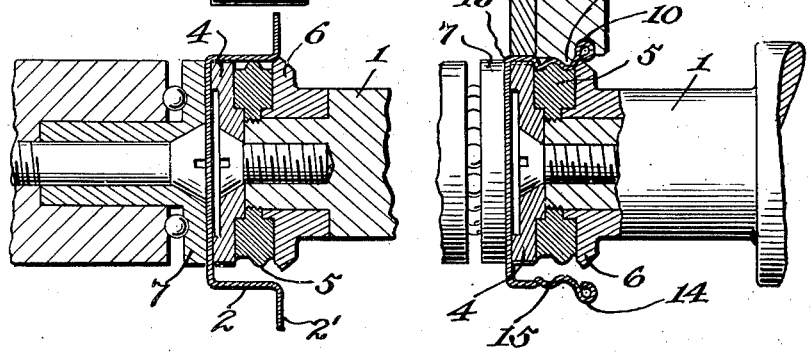
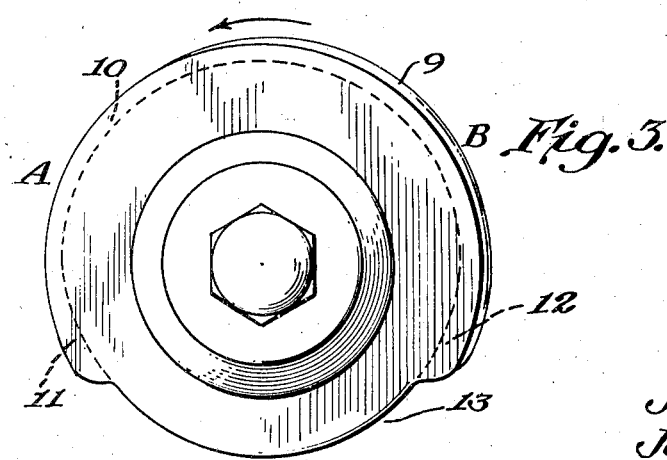
Inventor
John J. Williams
Jesse P. Heil
By Eccleston & Eccleston
Attorneys Patented Feb. 21, 1939

2,147,804

UNITED STATES PATENT OFFICE 2,147,804

APPARATUS FOR FORMING METAL CLOSURES

John J. Williams and Jesse P. Heil, Wheeling, W. Va., assignors to Hazel-Atlas Glass Company, Wheeling, W. Va., a corporation of West Virginia Application September 24, 1936, Serial No. 102,432

3 Claims. (Cl. 153—7)

The invention relates to an improved method for manufacturing metal closures having an incurled bead at the lower end of the skirt, and while the invention will be described with reference to a continuous thread closure, yet it will be understood that the method and apparatus are equally well adapted to the manufacture of closures having interrupted threads or other means for attaching the closure to a container.

While screw caps with incurled beads are old and well known, yet they have not been so commonly used as the conventional screw caps with an outcurled bead, and one of the reasons for this is that the incurled bead screw cap has been more difficult to manufacture.

Among the more important objects of the present invention are to provide a method and apparatus by which a conventional hat-shaped blank can be formed into a screw cap with an incurled bead by a single rolling operation, whereby caps of this type with incurled beads are manufactured as easily and inexpensively as the conventional caps with outcurled beads.

Numerous other objects and advantages of the invention will be apparent to those skilled in the art, from the following detailed description when taken in connection with the accompanying drawing; in which, Figure 1 is a side view of the male and female chucks, partly in section, and the chucks being almost in position to start the rolling operation.

Figure 2 is a similar view, but the position of the chucks being such that the rolling of the cap is nearly completed; and Figure 3 is a front view of the female chuck.

Referring to the drawing in more detail, numeral 1 refers to the spindle of the male chuck, upon which is mounted the conventional hat-shaped blank 2, and numeral 3 refers to the spindle of the female chuck.

The male chuck includes a knurling ring 4, if the cap is to be knurled, and a threading ring 5. An annular abutment 6 may also be provided on the male chuck. Numeral 7 refers to a conventional clamp for holding the blank in place on the male chuck.

In the preferred form of the invention the female chuck is of considerably greater diameter than the male chuck, the ratio in the present machines being about 3½ to 1. This feature of having the female chuck of much larger diameter than the male chuck is disclosed in Bert J. Huntsman Patent No. 2,045,602, June 30, 1936. The present invention, however, is not limited to a female chuck of much greater diameter than the male chuck, but is broad enough to include the use of a female chuck of substantially the same diameter as the male chuck, and on the other hand it is also broad enough to include a female chuck of greater ratio than the 3½ to 1 ratio mentioned above.

The female chuck includes a knurling ring 8, if the cap is to be knurled, a threading ring 9, and a curling groove 10. By reference to Figure 1 and particularly to Figure 3, it will be noted that the curling groove is of peculiar formation. The female chuck rotates in the direction indicated by the arrows, and the leading end of the groove 10, that is the part 11 which first engages the flange 2' of the blank 2, is relatively deep. This depth gradually decreases, as indicated by the dotted line in Figure 3. The groove reaches its minimum depth at the desired point, for example, at the point marked A, and thereafter, the groove preferably continues uniformly at its minimum depth for a considerable distance, for example, to the point marked B. The groove may be thereafter discontinued, but it is preferred to gradually release the incurled bead, and therefore in the preferred construction illustrated the bead is now gradually deepened up to its end, as indicated by numeral 12.

In the specific form of the apparatus illustrated, the female chuck has a cut-away portion 13, such as disclosed in Bert J. Huntsman application Serial No. 80,855, filed May 20, 1936 (Patent No. 2,122,525, granted July 5, 1938). As described in that application, the cut-away portion permits the blanks to be placed on the male chuck and the finished caps to be removed therefrom without moving the male and female chucks toward and from each other. While it is preferred to employ this feature in the present invention, yet it is to be understood that the invention is not limited to its use.

The operation of the apparatus, and the method, will now be described. And in this description it will be assumed that the female chuck is of much greater diameter than the male chuck, for example a ratio of 3½ to 1; and that the female chuck is provided with the cut-away portion 13. Of course both chucks are continuously rotating, and are geared together. When the cut-away 13 is opposite the male chuck a blank 2 having a flange 2' is placed on the male chuck by any desired means, and the continued rotation of the chucks brings the leading portion 11 of the curling groove 10 into engagement with the flange, and this portion of the groove being relatively deep the incurling of the flange 2' is started easily, and as the depth of the groove lessens the flange is gradually curled into a complete incurled bead 14. In the preferred form of the method and apparatus the male chuck and blank make substantially a complete turn with the flange in the relatively deep portion of the curling groove, and then substantially a complete turn in the relatively shallow portion of grove. When the curling of the bead is completed, for example at the point B, it is preferred not to suddenly release the bead by discontinuing the groove, and the gradual release is accomplished by gradually deepening the groove, as indicated by numeral 12. While the bead is being curled in the shallow part of the groove, the pressure causes the spindles to be sprung. If this pressure is suddenly relieved, by abruptly ending the curling groove, the spindles snap back into position, causing the rolls to come closer together suddenly, thereby causing a mark in the cap where the curling groove ends. This marring of the caps is avoided by gradually increasing the depth of the groove.

While this bead is being formed the threading of the blank is also started, in the specific form illustrated. By reference to Figure 3 it will be noted that the threading starts after the bead has been curled somewhat, and the continued rotation of the chucks forms the screw thread 15. When the female chuck has turned far enough to again bring the cut-away portion 13 opposite the male chuck, the completed cap 16 is removed, and when the cut-away portion is against opposite the male chuck another blank is placed on the male chuck and the forming operation repeated. Thus a screw cap with an incurled bead is rolled with the same ease and at the same rate of production as a conventional screw cap with an outcurled bead. It has been proposed heretofore to roll screw caps with an incurled bead, but such prior proposal required two entirely separate rolling operations to form the incurled bead. As far as is known, this is the first method and apparatus devised by which it is possible to form an incurled bead on a screw cap in a single rolling operation.

We have described above the preferred form of the method and apparatus, but in carrying out this invention it is not necessary to employ the cut-away portion of the female chuck. This can be omitted and the chucks moved toward and away from each other in accordance with the practice prior to the invention disclosed in the above-mentioned Huntsman application Serial No. 80,855 (Patent No. 2,122,525, granted July 5, 1938). Likewise, the diameter ratio between the female chuck and the male chuck could be made greater than 3½ to 1, for example the ratio could be 5 to 1. With such a large ratio the incurled bead could be gradually completed in the manner described above, and could be released, preferably gradually, prior to the commencement of the threading operation. Also, the ratio could be much smaller than 3½ to 1; it being only necessary to start the threading operation earlier. In other words, the forming of the thread and the incurling of the bead may be entirely consecutive, and either operation may be performed first, or the two operations may be performed substantially simultaneously, or as in the case illustrated herein there may be an overlapping of the two operations, with the threading starting after the curling operation has been to a considerable extent completed.

Having fully described the invention, what we claim is:

1. An apparatus for rolling metal closures, including male and female chucks, the male chuck adapted to receive a flanged blank, the female chuck having a curling groove for engaging the flange, said groove having two relatively deep portions, and an intermediate shallow portion.

2. An appartus for rolling metal closures, including male and female chucks, said chucks being rotatable in opposite directions, the male chuck adapted to receive a flanged blank, the female chuck having a cut-away portion, the female chuck having a curling groove, the leading end of said groove commencing at the cut-away portion and gradually decreasing in depth through a substantial distance around the chuck, whereby the curling effect is progressively increased, and the portion of the curling groove immediately following the portion of gradually decreasing depth being of uniform depth, and the length of the portion of uniform depth being greater than the length of the portion of gradually decreasing depth.

3. An apparatus for rolling metal closures, including male and female chucks, said chucks being rotatable in opposite directions, the male chuck adapted to receive a flanged blank, the female chuck having a cut-away portion, the female chuck having a curling groove, said groove through the major portion of its length being of uniform depth, the following end of the curling groove gradually increasing in depth, thereby gradually releasing the pressure on the curled metal.

JOHN J. WILLIAMS.
JESSE P. HEIL.